(12) United States Patent
Teuwen et al.

(10) Patent No.: US 9,576,116 B2
(45) Date of Patent: Feb. 21, 2017

(54) SECURE SOFTWARE COMPONENTS ANTI-REVERSE-ENGINEERING BY TABLE INTERLEAVING

(71) Applicant: NXP B.V., Eindhoven (NL)

(72) Inventors: Philippe Teuwen, Etterbeek (BE); Ventzislav Nikov, Haasrode (BE); Peter Maria Franciscus Rombouts, Sint-Katelijine-Waver (BE)

(73) Assignee: NXP B.V., Eindhoven (NL)

( * ) Notice: Subject to any disclaimer, the term of this patent is extended or adjusted under 35 U.S.C. 154(b) by 253 days.

(21) Appl. No.: 14/140,938

(22) Filed: Dec. 26, 2013

(65) Prior Publication Data
US 2015/0186627 A1    Jul. 2, 2015

(51) Int. Cl.
*G06F 21/14* (2013.01)
*H04L 9/00* (2006.01)

(52) U.S. Cl.
CPC .............. *G06F 21/14* (2013.01); *H04L 9/002* (2013.01); *G06F 2221/0748* (2013.01); *H04L 2209/16* (2013.01)

(58) Field of Classification Search
CPC ....................................................... G06F 21/14
USPC ....................................................... 713/190
See application file for complete search history.

(56) References Cited

U.S. PATENT DOCUMENTS

| | | | | |
|---|---|---|---|---|
| 5,159,687 A | * | 10/1992 | Richburg | G06F 8/36 706/45 |
| 5,295,256 A | * | 3/1994 | Bapat | G06F 17/30595 707/999.003 |
| 5,903,653 A | * | 5/1999 | Ross et al. | B60R 25/042 380/271 |
| 5,937,401 A | * | 8/1999 | Hillegas | G06F 17/30489 |
| 5,960,194 A | * | 9/1999 | Choy | G06F 9/355 |
| 7,610,627 B1 | * | 10/2009 | McKenna | G06F 21/62 713/168 |
| 7,788,258 B1 | * | 8/2010 | Malpani | G06F 17/30265 707/706 |
| 7,805,429 B2 | * | 9/2010 | Abrams | G06Q 30/02 707/706 |

(Continued)

FOREIGN PATENT DOCUMENTS

| | | |
|---|---|---|
| WO | 0077596 A1 | 12/2000 |
| WO | WO 2005114478 A2 * | 12/2005 ....... G06F 17/30312 |

OTHER PUBLICATIONS

Plasmans, "White-Box Cryptography for Digital Content Protection", 2005.*

(Continued)

*Primary Examiner* — O. C. Vostal (57) ABSTRACT

A method of securely implementing functions in a secure software application, including: determining, by a processor, two functions to be implemented by the secure software application; generating a first function lookup table; encrypting the first function lookup table; sorting the first function lookup table by encrypted operand; generating a second function lookup table; encrypting the second function lookup table; sorting the second function lookup table by encrypted operand; generating a flattened lookup table from a combination of the encrypted first and second function lookup tables; permutating the flattened table indices e.g. by use of public key cryptography encryption; and sorting the flattened table by the permutated flattened table indices.

20 Claims, 5 Drawing Sheets

(56) References Cited

U.S. PATENT DOCUMENTS

| | | | |
|---|---|---|---|
| 8,050,406 B2* | 11/2011 | Pedlow, Jr. | H04N 21/26606 380/200 |
| 8,190,921 B1* | 5/2012 | Harwood | G06F 21/6209 713/189 |
| 8,473,754 B2* | 6/2013 | Jones | G06F 21/53 380/277 |
| 8,843,745 B2* | 9/2014 | Roberts, Jr. | H04L 9/3271 380/229 |
| 9,087,212 B2* | 7/2015 | Balakrishnan | G06F 21/6227 |
| 9,213,696 B2* | 12/2015 | Cancedda | G06F 17/289 |
| 2002/0038384 A1* | 3/2002 | Khan | G06F 17/30905 709/245 |
| 2002/0156757 A1* | 10/2002 | Brown | G06Q 10/06 |
| 2003/0039362 A1* | 2/2003 | Califano | G06F 21/6254 380/283 |
| 2003/0208448 A1* | 11/2003 | Perry | G05B 19/4183 705/64 |
| 2004/0049737 A1* | 3/2004 | Simon Hunt | G06F 17/30905 715/238 |
| 2004/0103404 A1 | 5/2004 | Naumovich et al. | |
| 2005/0193214 A1* | 9/2005 | Noh | G06F 21/72 713/193 |
| 2006/0034459 A1* | 2/2006 | Uchikawa | G06F 21/6209 380/255 |
| 2006/0265563 A1* | 11/2006 | Goettfert | G06F 12/1408 711/164 |
| 2008/0082834 A1* | 4/2008 | Mattsson | G06F 21/6209 713/189 |
| 2008/0215862 A1 | 9/2008 | Haga et al. | |
| 2008/0288448 A1* | 11/2008 | Agredano | G06Q 30/00 |
| 2009/0067629 A1* | 3/2009 | Kraszewski | H04L 63/0428 380/251 |
| 2010/0070345 A1* | 3/2010 | Abelow | G06Q 10/101 705/14.44 |
| 2010/0077205 A1* | 3/2010 | Ekstrom | H04L 63/0428 713/153 |
| 2010/0146299 A1* | 6/2010 | Swaminathan | G06F 17/30666 713/189 |
| 2010/0169665 A1* | 7/2010 | Kang | G06F 17/30321 713/189 |
| 2010/0228939 A1* | 9/2010 | Lee | G06F 21/72 711/168 |
| 2010/0250958 A1* | 9/2010 | Browning | G06F 21/6227 713/189 |
| 2011/0091033 A1* | 4/2011 | Michiels | H04L 9/304 380/28 |
| 2011/0138190 A1* | 6/2011 | Chase | G06F 21/6227 713/189 |
| 2011/0286596 A1* | 11/2011 | Gressel | H04L 9/0637 380/268 |
| 2012/0002807 A1* | 1/2012 | Michiels | H04L 9/002 380/28 |
| 2012/0114302 A1* | 5/2012 | Randall | G11B 27/105 386/241 |
| 2012/0155638 A1 | 6/2012 | Farrugia et al. | |
| 2012/0170740 A1* | 7/2012 | Lee | H04L 9/0618 380/44 |
| 2013/0046995 A1* | 2/2013 | Movshovitz | H04L 9/0618 713/189 |
| 2013/0061061 A1* | 3/2013 | Farrugia | G09C 1/00 713/190 |
| 2013/0067225 A1* | 3/2013 | Shochet | G06F 21/6209 713/165 |
| 2013/0159695 A1* | 6/2013 | Chiueh | G06F 21/6227 713/150 |
| 2013/0191650 A1* | 7/2013 | Balakrishnan | G06F 21/6227 713/190 |
| 2013/0262852 A1* | 10/2013 | Roeder | G06F 21/602 713/150 |
| 2015/0067441 A1* | 3/2015 | Gorissen | G06F 7/544 714/759 |
| 2015/0095367 A1* | 4/2015 | Mattsson | G06F 17/30528 707/769 |
| 2015/0095664 A1* | 4/2015 | Furukawa | G06F 21/62 713/193 |

OTHER PUBLICATIONS

Chow et al., "White-Box Cryptography and an AES Implementation", 2003.*
Merriam-Webster, "processor", 2014.*
Merriam-Webster, "permutation", 2015.*
Webopedia, "operand", 2016.*
Merriam-Webster, "operand", 2016.*
Hilewitz et al., "Accelerating the Whirlpool Hash Function Using Parallel Table Lookup and Fast Cyclical Permutation", 2008.*
Shi et al., "Arbitrary Bit Permutations in One or Two Cycles", 2003.*
Lee et al., "Efficient Premutation Instructions for Fast Software Cryptgraphy", 2001.*
Shi et al., "Bit Permutation Instructions for Accelerating Software Cryptography", 2000.*
Berdaguer et al., "Coupled Schema Transformation and Data Coversion for XML and SQL", 2007.*
Chineyanga et al., "An Expressive and Efficient Language for XML Information Retrieval", 2002.*
Gurel et al., "On the Trade-Off Between Iterative Classification and Collective Classification: First Experimental Results", 2005.*
D'Ambra et al., "Joint Non-symmetrical Correspondence Analysis with Ordered Categories", 2002.*
Lauro et al., "Exploratory Methods and Modelling for Contingency Tables Analysis: An Integrated Approach", 1989.*
Lin et al., "Data Processing Framework for Preprocessing Clinical Data in Data Mining", 2006.*
Shailesh et al., "Comparison of different data mining techniques to predict hospital length of stay", 2011.*
European Search Report for EP Application No. 14199138 dated May 22, 2015.
Hamilton, et al., "Clarifying Obfuscation: Improving the Security of White-Box Encoding", International Association for Cryptologic Research, Jan. 30, 2004, pp. 1-11.
Muir, "A Tutorial on White-box AES", International Association for Cryptologic Research, Feb. 28, 2013, pp. 4-15.

* cited by examiner

| + | 0 | 1 | 2 | ..... | N |
|---|---|---|---|---|---|
| 0 | 0 | 1 | 2 | ..... | |
| 1 | 1 | 2 | 3 | ..... | |
| 2 | 2 | 3 | 4 | ..... | |
| . . . . | . . . . | . . . . | . . . . | | . . . . |
| N | | | | ..... | 2N |

FIG. 1

| x | 0 | 1 | 2 | ..... | N |
|---|---|---|---|---|---|
| 0 | 0 | 0 | 0 | ..... | |
| 1 | 0 | 1 | 2 | ..... | |
| 2 | 0 | 2 | 4 | ..... | |
| . . . . | . . . . | . . . . | . . . . | | . . . . |
| N | | | | ..... | $N^2$ |

FIG. 2

| + | 9 | 92 | 47 | ..... | 7 |
|---|---|----|----|-------|---|
| 9 | 9 | 92 | 47 | ..... |   |
| 92| 92| 47 | 72 | ..... |   |
| 47| 47| 72 | 18 | ..... |   |
| . | . | .  | .  |       | . |
| . | . | .  | .  |       | . |
| . | . | .  | .  |       | . |
| . | . | .  | .  |       | . |
| 7 |   |    |    | ..... | 57|

FIG. 3

| + | 1 | 2 | 3 | ..... | N |
|---|---|---|---|-------|---|
| 1 | 98| 19| 34| ..... |   |
| 2 | 19| 34| 48| ..... |   |
| 3 | 34| 48| 75| ..... |   |
| . | . | . | . |       | . |
| . | . | . | . |       | . |
| . | . | . | . |       | . |
| . | . | . | . |       | . |
| N |   |   |   | ..... | 64|

FIG. 4

| OR | 1 | 2 | 3 | ..... | N |
|----|---|---|---|-------|---|

| X | 1 | 2 | 3 | ..... | N |
|---|---|---|---|-------|---|

| + | 1 | 2 | 3 | ..... | N |
|---|----|----|----|-------|---|
| 1 | 98 | 19 | 34 | ..... |   |
| 2 | 19 | 34 | 48 | ..... |   |
| 3 | 34 | 48 | 75 | ..... |   |
| . | . | . | . | | . |
| . | . | . | . | | . |
| . | . | . | . | | . |
| N |   |   |   | ..... | 64 |

SECURE SOFTWARE COMPONENTS ANTI-REVERSE-ENGINEERING BY TABLE INTERLEAVING

TECHNICAL FIELD

Various exemplary embodiments disclosed herein relate generally to securing software components by table interleaving to make reverse-engineering the secure software more difficult.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. One way to obscure these functions is by the use of lookup tables.

Content providers must deliver content to legitimate users across a hostile network to a community where not all users or devices can be trusted. This has lead to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content.

The two main areas of vulnerability of digital rights management relying on encryption are the software modules which enforce the terms and conditions under which the content may be used, and the key distribution and handling. Typically, the software module enforces the terms and conditions under which the content is to be used. An attacker aiming to bypass these terms and conditions may attempt to achieve this through tampering of the program code of the software module.

Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of DRM and other secure software has given rise to the need for secure, tamper-resistant software seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. Further, the secure functions carried out by the white-box cryptography system are any type of secure functions, for example, addition, multiplication, OR, AND, XOR, etc. White-box cryptography functions may be implemented in various ways. Such methods include: obscuring the software code: using complex mathematical functions that obscure the use of the secret information: using look-up tables: or any other methods that carry out cryptographic functions but hide the secret information needed for those secure functions. Typically a white-box implementation will also contain components to bring anti-debugging and tamper-proofing properties.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of securely implementing functions in a secure software application, including: determining, by a processor, two functions to be implemented by the secure software application; generating a first function lookup table; encrypting the first function lookup table; sorting the first function lookup table by encrypted operand; generating a second function lookup table; encrypting the second function lookup table; sorting the second function lookup table by encrypted operand; generating a flattened lookup table from a combination of the encrypted first and second function lookup tables; permutating the flattened table indices; and sorting the flattened table by the permutated flattened table indices.

Further, various exemplary embodiments relate to a non-transitory machine-readable storage medium encoded with instructions for execution by a processor for securely implementing functions in a secure software application, the medium including: instructions for determining two functions to be implemented by the secure software application; instructions for generating a first function lookup table; instructions for encrypting the first function lookup table; instructions for sorting the first function lookup table by encrypted operands; instructions for generating a second function lookup table; instructions for encrypting the second function lookup table; instructions for sorting the second function lookup table by encrypted operands; instructions for generating a flattened lookup table from a combination of the encrypted first and second function lookup tables; instructions for permutating the flattened table indices; and instructions for sorting the flattened table by the permutated flattened table indices.

Further, various exemplary embodiments relate to a method of securely calculating a function in a secure software application using an encrypted table, including: receiving, by a processor, operands and a function to perform; determining a table index based upon the function and encrypted operands; permutating the table index; and determining the result of the function by using the permutated table index to look up the result in the encrypted table.

Further, various exemplary embodiments relate to a non-transitory machine-readable storage medium encoded with instructions for execution by a processor for securely calculating a function in a secure software application using an encrypted table, including: instructions for receiving operands and a function to perform; instructions for determining a table index based upon the function and encrypted operands; instructions for permutating the table index; and instructions for determining the result of the function by using the permutated table index to look up the result in the encrypted table.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

As described above secure software applications may be used to carry out various functions. A typical secure software application may replace operations on plaintext operands with pre-computed encrypted operations over encrypted operands. For example a z=ADD(x,y) will be replaced by a table lookup E(z)=lookup_table_ADD(E(x), E(y)) where E(x) and E(y) are encrypted versions of operands x and y and are also coordinates within table_ADD and where E(z) is the encrypted output of the ADD function. However by careful analysis of those lookup tables, one may recover the underlying encryption key, for example, by treating all table entries as equations to be solved. Further, such analysis may be even easier for the tables implementing unbalanced operations (e.g., AND, OR, INC, etc.) or for the tables implementing the encryption/decryption steps which need to happen in order to deal with secure software component input/output.

A solution to this problem may include: considering the operation as another coordinate within one unique large table so that, for example, E(z)=lookup_table_ADD(E(x), E(y)) becomes E(z)=lookup_bigtable(ADD, E(x), E(y)); and permutating all indexes.

Figure 1:
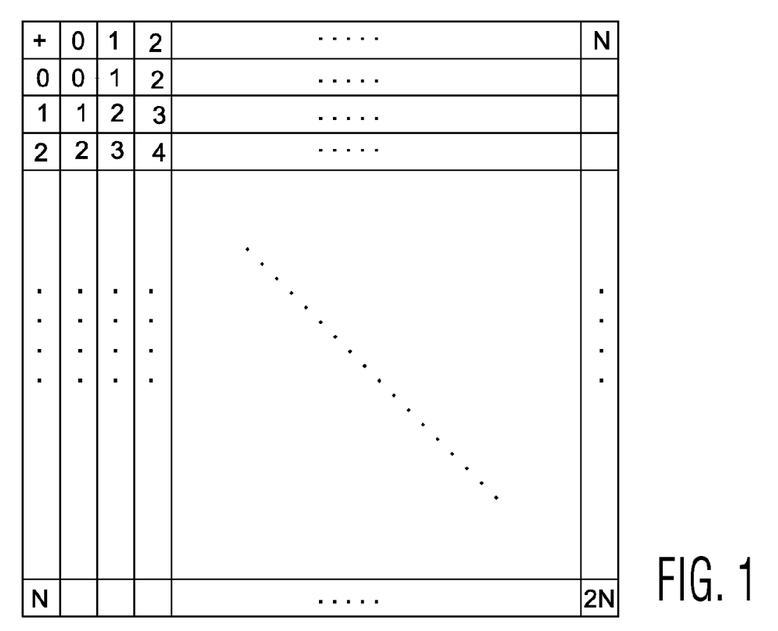
FIG. 1 illustrates a lookup table for implementing an ADD (+) function.
Figure 2:
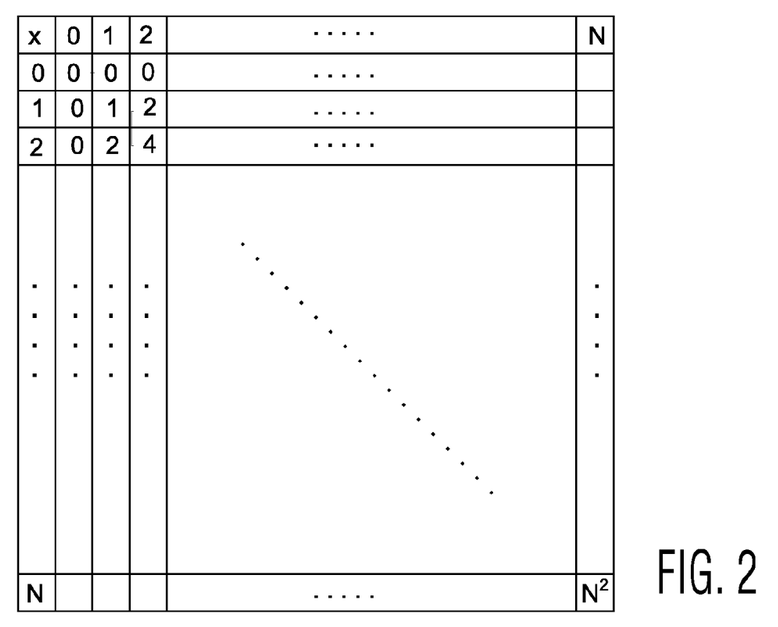
FIG. 2 illustrates a lookup table for a MULT (x) function.

An embodiment of such a solution will now be described. FIG. 1 illustrates a lookup table for implementing an ADD (+) function. The table has a size of N×N. FIG. 2 illustrates a lookup table for a MULT (x) function. This table also has a size of N×N.

Figure 3:
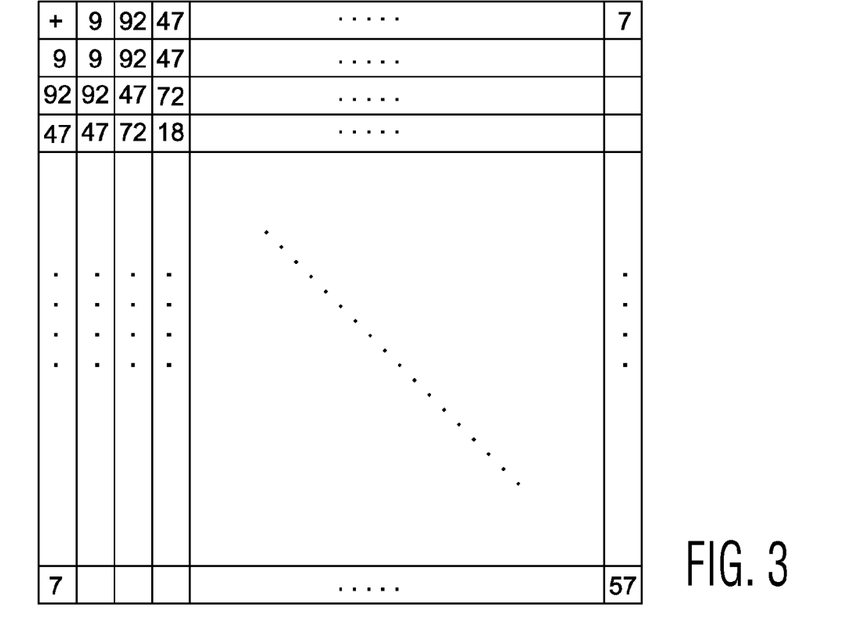
FIG. 3 a lookup table of the ADD table where the operands and results have been encrypted.
Figure 4:
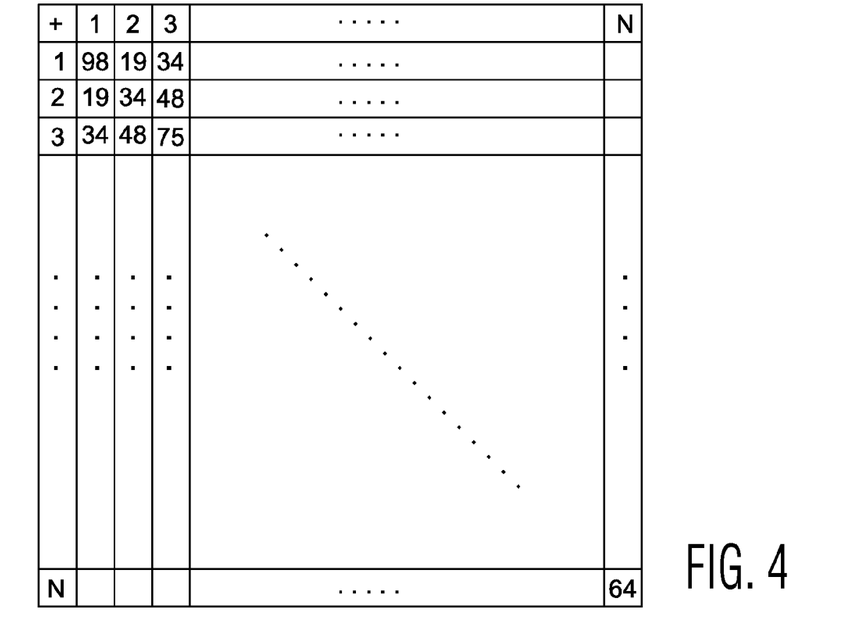
FIG. 4 illustrates a sorted encrypted table.

Next, the function table may be encrypted. In FIG. 3, the operands and the results of the ADD table have been encrypted. Any type of encryption may be used to encrypt the values of the table. Then the table is sorted by the two operands to place the operands back in order. FIG. 4 illustrates a sorted encrypted table. As a result the table is now usable for quick look-ups after being sorted.

Figure 5:
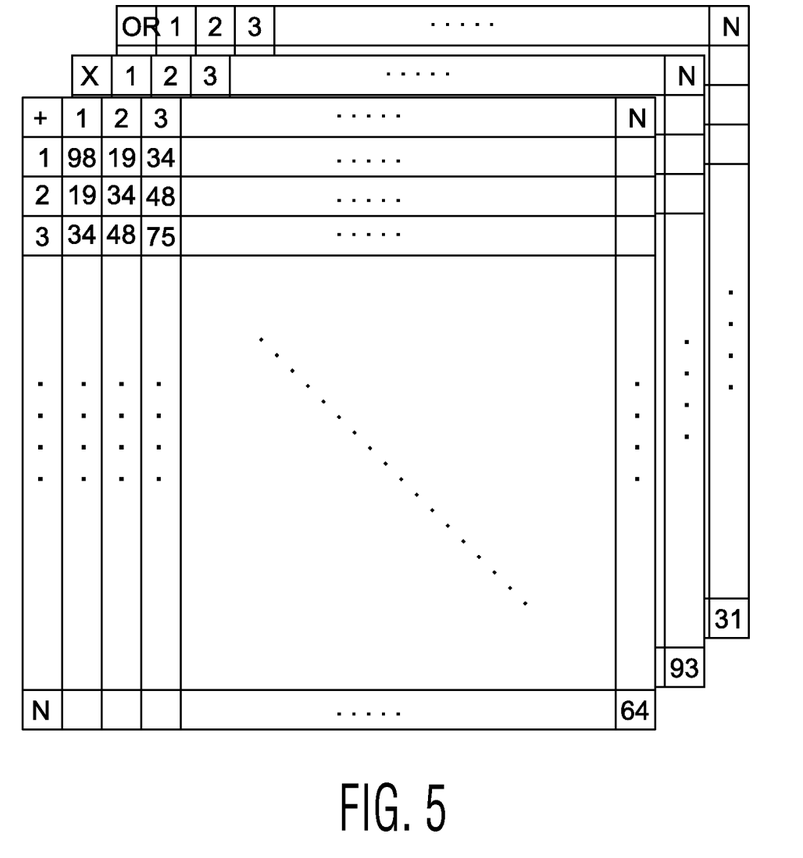
FIG. 5 illustrates combining of a plurality of encrypted tables for different functions.

FIG. 5 illustrates combining of a plurality of encrypted tables for different functions. The combined single table is now a three dimensional table that is indexed by function (e.g., ADD, MULT, OR, etc.) and encrypted operand(s), for example, E(x) and E(y). If there are M functions and the range of the operands is N values, the resulting table will be a M×N×N dimensioned three dimensional table. In practical implementations, such a three dimensional table may be stored as a single array with a single index l, so the three dimensional table may be flattened into a single dimensional table. So if a location in the three dimensional table is identified by the triplet (i, j, k) where i indicates the function, and j and k are indices for the encrypted operands, the single index l=index(i,j,k) into the flattened table may be calculated as (i×N+j)×N+k.

The single array may be further permutated. This may be accomplished by performing a further encryption on the indices of the flattened table. For example, a public key encryption method may be used. Such encryption may break the monotony of the indices. Next, the flattened table may be sorted based upon the encrypted indices, again allowing for easier access and to further obscure the functions implemented by the flatten table. Other types of encryption may be performed on the indices as well.

One example of encrypting the indices with a public key method before using the table is:

$$E(z)=\text{lookup\_flattable}(g^{\wedge}(\text{index}(ADD,E(x),E(y))))$$

where g is a fixed value that is a generator of a finite cyclic group G of a given order. Thus, for each lookup of index l, compute g^l. An example is the multiplicative group of a finite field and discrete logarithm like operation. The resulting table will be of size at least of the order of G and may be sparse for obfuscation. If sparse, it may be filled with operation synonyms.

Another encryption example is:

$$E(z)=\text{lookup\_flattable}(\text{index}(ADD,E(x),E(y)))^{\wedge}\text{exponent})$$

where the index is the group generator which is always raised to a fixed exponent. For example using the same finite cyclic group as in the previous example or RSA for example where the operations are performed mod p*q and the exponent has additional restrictions according to the RSA protocol.

Alternatively the three dimensional table can be converted to a hash table by e.g. the following steps: operands and operator are combined together into one single value, e.g., by computing the single index l described above or by simple concatenation. Then this value is transformed e.g. by means of any one-way function, or simpler functions such as permutations of bits, provided that there is no collision amongst the resulting values. Typically the resulting values could be from a much larger space than the original table indices (SHA1 hash is 160-bit long) and cannot be truncated to a value to be used as index without running into a major risk of collisions. But turning the lookup table into a hash table and the transformed values into keys for this hash table solves the problem. A hash function generator can find a function of those transformed values which will always return a unique value, such that E(z) can be found with a minimum of look up operations, one single lookup operation if the hash function generator is "perfect" such as the GNU gperf (https://www.gnu.org/software/gperf/).

Figure 6:
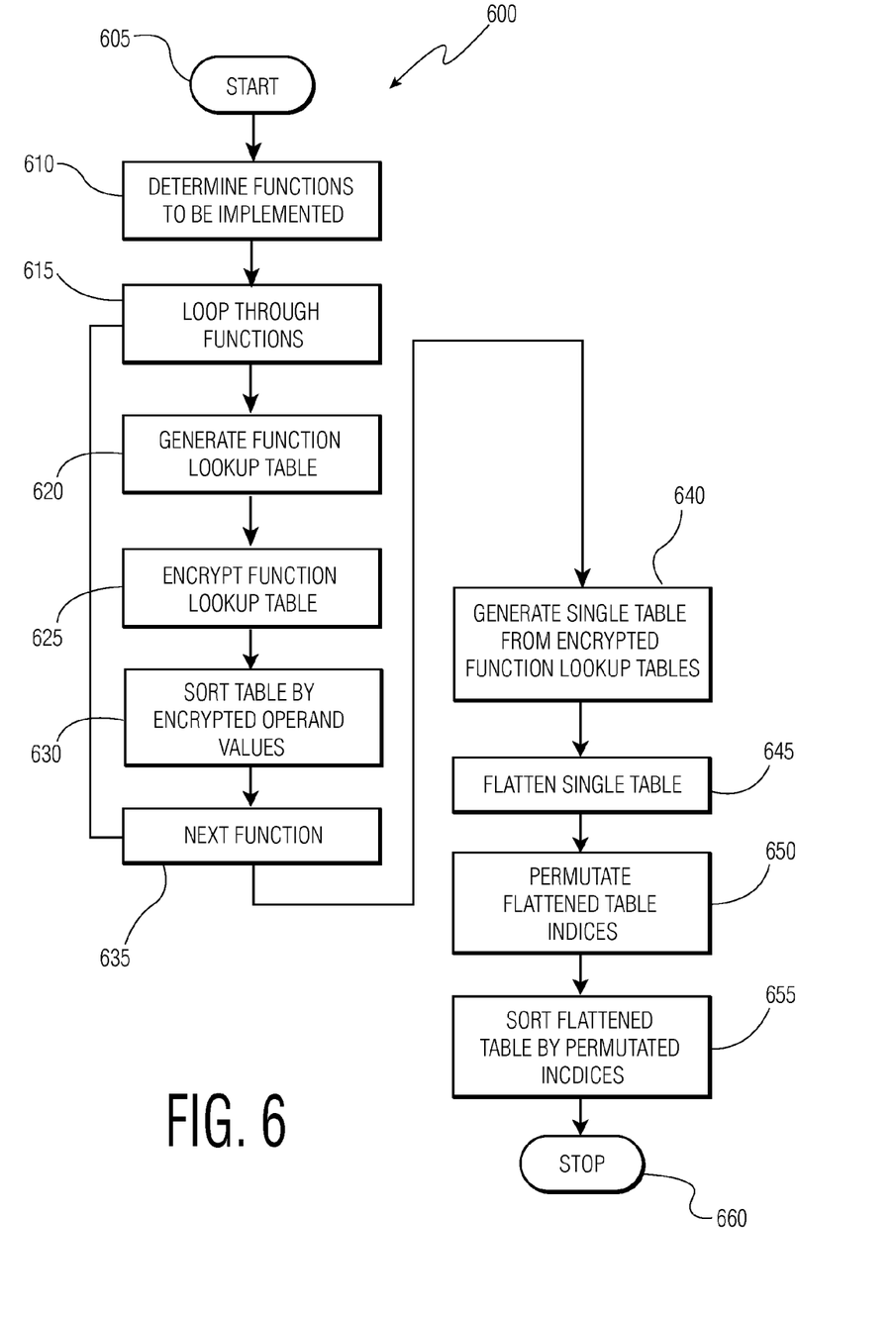
FIG. 6 illustrates an embodiment of a method of generating the encrypted flatten function table.

FIG. 6 illustrates an embodiment of a method of generating the encrypted flattened function table. The method 600 begins at 605. Next, the method determines the functions to be implemented 610. Then the method begins a loop through the various functions 615. Next, the method generates a function lookup table 620. This function lookup table may have a size N×N where N specifies the number of possible operand values. The method then encrypts the function lookup table 625. This includes encrypting the operands and the result values of the function lookup table. Next, the method then sorts the function lookup table by encrypted operand values 630. The method at step 635 may loop back to step 615 if more function lookup tables are to be generated, but will proceed to step 640 when all of the function lookup tables have been generated. The method then generates a single three dimensional table from the encrypted function lookup tables 640. Next, the method may flatten this single three dimensional table into a single dimensional flattened table 645. The method then may permute the indices of the flattened table 650. Such permutation may be achieved by use of public key encryption or another type of cryptography as described above. Next, the method may sort the flattened table by the encrypted indices 655. The method then ends at 660.

The method 600 will typically be performed during the development of the secure software application. For example, the secure software application code may be written using a high level language. Then the method 600 may be carried out to produce the flattened table. The secure software application code may be converted to a series of calculations on operands input into a function, followed by a look up in the flattened table to determine the result of the function based upon the operands. This may be done, for example, when the secure software application code is compiled. During operation, initial input operands will be first encrypted before use with the flattened table. Any results obtained from the flattened table will be encrypted so they will not need to be encrypted. Accordingly, the method 600 may be implemented as software running on a processor.

Figure 7:
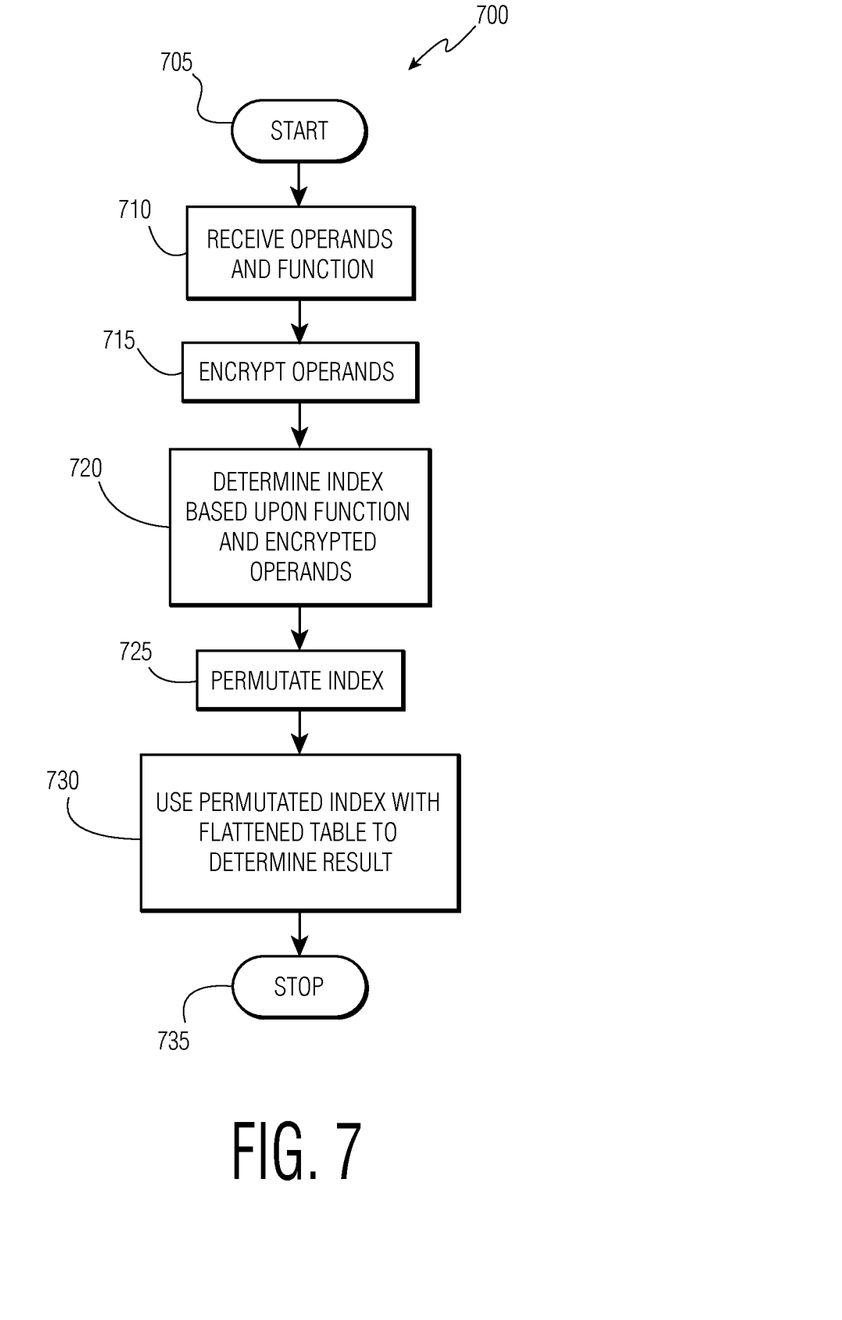
FIG. 7 illustrates an embodiment of a method using the flattened table to calculate a function.

FIG. 7 illustrates an embodiment of a method using the flattened table to calculate a function. The method 700 beings at 705. Next, the method receives the operands and the function to be performed on the operands. Next, the operands may be encrypted 715. If the operands are the output of a previously calculated function, they will already be encrypted, so the encryption of step 715 is skipped for such operands. Then the method 700 determines an index based upon the function and the encrypted operands. Next, the method 700 computes the permutated index e.g. by using encryption. Examples of such encryption were described above. Then the method 700 uses the encrypted index to lookup the result of the function in flattened table. The method 700 then ends at 735.

The method 700 may be implemented on a processor that is implementing the secure software application. Various iterations of the method 700 may be combined to implement various calculations required by the secure software application. The encryptions of the operands of the functions, combining various functions into a single table, and then permutating single table provide increased security for the secure software application. It becomes much more difficult for an attacker of the secure software application to reverse engineer the functions implemented by these methods.

As used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of securely implementing functions in a secure software application, comprising:
    determining, by a hardware processor, two functions to be implemented by the secure software application;
    generating a first function lookup table;
    encrypting the first function lookup table;
    sorting the first function lookup table by encrypted operand;
    generating a second function lookup table;
    encrypting the second function lookup table;
    sorting the second function lookup table by encrypted operand;
    generating a flattened lookup table from a combination of the encrypted first and second function lookup tables;
    permutating indices of the flattened table; and
    sorting the flattened table by the permutated flattened table indices.

2. The method of claim 1, wherein flattened table indices are permutated using public key cryptography encryption.

3. The method of claim 1, wherein flattened table indices are encrypted by index^exponent, where index is a group generator and the exponent is a fixed value.

4. The method of claim 1, wherein flattened table indices are encrypted by g^index, where g is a fixed value that is a generator of a finite cyclic group G of a given order.

5. The method of claim 1, wherein permutating the flattened table indices includes converting the flattened lookup table into a hash table by transforming and using the flattened table indices as keys.

6. A non-transitory machine-readable storage medium encoded with instructions for execution by a hardware processor for securely implementing functions in a secure software application, the medium comprising:
    instructions for determining two functions to be implemented by the secure software application;
    instructions for generating a first function lookup table;
    instructions for encrypting the first function lookup table;
    instructions for sorting the first function lookup table by encrypted operand;
    instructions for generating a second function lookup table;
    instructions for encrypting the second function lookup table;
    instructions for sorting the second function lookup table by encrypted operand;
    instructions for generating a flattened lookup table from a combination of the encrypted first and second function lookup tables;
    instructions for permutating indices of the flattened table; and
    instructions for sorting the flattened table by the permutated flattened table indices.

7. The non-transitory machine-readable storage medium of claim 6, wherein flattened table indices are encrypted using public key cryptography.

8. The non-transitory machine-readable storage medium of claim 6, wherein flattened table indices are encrypted by index^exponent, where index is a group generator and the exponent is a fixed value.

9. The non-transitory machine-readable storage medium of claim 6, wherein flattened table indices are encrypted by g^index, where g is a fixed value that is a generator of a finite cyclic group G of a given order.

10. The non-transitory machine-readable storage medium of claim 6, wherein permutating the flattened table indices includes converting the flattened lookup table into a hash table by transforming and using the flattened table indices as keys.

11. A method of securely calculating a function in a secure software application using an encrypted table, comprising:
    receiving, by a hardware processor, a first encrypted operand, a second encrypted operand, and a function to perform;
    determining a table index based upon the function and the encrypted operands;
    permutating the table index; and
    determining the result of the function by using the permutated table index to look up the result in the encrypted table.

12. The method of claim 11, wherein flattened table indices are permutated using public key cryptography encryption.

13. The method of claim 11, wherein flattened table indices are encrypted by index^exponent, where index is a group generator and the exponent is a fixed value.

14. The method of claim 11, wherein flattened table indices are encrypted by g^index, where g is a fixed value that is a generator of a finite cyclic group G of a given order.

15. The method of claim 11, wherein permutating the table indices includes converting the flattened lookup table into a hash table by transforming and using the flattened table indices as keys.

16. A non-transitory machine-readable storage medium encoded with instructions for execution by a hardware processor for securely calculating a function in a secure software application using an encrypted table, comprising:
    instructions for receiving, by a hardware processor, a first encrypted operand, a second encrypted operand, and a function to perform;
    instructions for determining a table index based upon the function and the encrypted operands;
    instructions for permutating the table index; and
    instructions for determining the result of the function by using the permutated table index to look up the result in the encrypted table.

17. The non-transitory machine-readable storage medium of claim 16, wherein flattened table indices are permutated using public key cryptography encryption.

18. The non-transitory machine-readable storage medium of claim 16, wherein flattened table indices are encrypted by index^exponent, where index is a group generator and the exponent is a fixed value.

19. The non-transitory machine-readable storage medium of claim 16, wherein flattened table indices are encrypted by g^index, where g is a fixed value that is a generator of a finite cyclic group G of a given order.

20. The non-transitory machine-readable storage medium of claim 16, wherein permutating the table indices includes converting the flattened lookup table into a hash table by transforming and using the flattened table indices as keys.

* * * * *